US012447361B2

(12) United States Patent
Shen et al.

(10) Patent No.: US 12,447,361 B2
(45) Date of Patent: *Oct. 21, 2025

(54) CUSTOM-CONTROLLABLE POWERED RESPIRATOR FACE MASK

(71) Applicant: HONEYWELL SAFETY PRODUCTS USA, INC., Charlotte, NC (US)

(72) Inventors: Jiali Shen, Morris Plains, NJ (US); Hongbing Xiang, Morris Plains, NJ (US); Matthew Chen, Morris Plains, NJ (US); Jerry Shen, Morris Plains, NJ (US); Yiming Hua, Morris Plains, NJ (US)

(73) Assignee: Honeywell Safety Products USA, Inc., Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,415

(22) Filed: May 20, 2024

(65) Prior Publication Data

US 2024/0299781 A1 Sep. 12, 2024

Related U.S. Application Data

(63) Continuation of application No. 18/060,388, filed on Nov. 30, 2022, now Pat. No. 12,017,094, which is a (Continued)

(51) Int. Cl.

| | |
|---|---|
| ***A62B 18/08*** | (2006.01) |
| ***A62B 7/10*** | (2006.01) |

(Continued)

(52) U.S. Cl.

CPC ................ *A62B 18/08* (2013.01); *A62B 7/10* (2013.01); *A62B 9/00* (2013.01); *A62B 18/006* (2013.01); *A62B 9/006* (2013.01); *A62B 18/088* (2013.01)

(58) Field of Classification Search

CPC ........... A62B 18/08; A62B 9/00; A62B 9/006; A62B 18/088; A62B 17/006; A62B 18/04;

(Continued)

(56) References Cited

U.S. PATENT DOCUMENTS

| | | | | |
|---|---|---|---|---|
| 2,652,830 A * | 9/1953 | Koza | .................... | A62B 18/025 128/205.25 |
| 5,950,621 A | 9/1999 | Klockseth et al. | | |

(Continued)

FOREIGN PATENT DOCUMENTS

| | | |
|---|---|---|
| CN | 2525941 Y | 12/2002 |
| CN | 103961822 A | 8/2014 |

(Continued)

OTHER PUBLICATIONS

English translation of CN 105876933, machine translated by Espacenet.com.*

(Continued)

*Primary Examiner* — Tu A Vo

(74) *Attorney, Agent, or Firm* — Fredrikson & Byron, P.A.

(57) ABSTRACT

Embodiments relate generally to respirator face masks, and specifically to powered face masks which may be custom-controllable to better provide for the specific air needs of the individual user wearing the mask. For example, the face mask embodiments typically include a filter and a motorized fan, both generally located on the face mask itself, along with a processor. The processor then may use inputs, for example specific to the user and/or the environment, to control the fan speed. Thus, the fan speed of the face mask may be custom controlled to provide the appropriate amount of filtered air as the specific user needs it.

18 Claims, 4 Drawing Sheets

Related U.S. Application Data continuation of application No. 16/336,945, filed as application No. PCT/CN2016/100768 on Sep. 29, 2016, now Pat. No. 11,541,255.

(51) Int. Cl.
*A62B 9/00* (2006.01)
*A62B 18/00* (2006.01)

(58) Field of Classification Search
CPC ....... A62B 18/006; A62B 18/00; A62B 23/00; A62B 7/00; A62B 7/10; A62B 17/00; A62B 17/04; A62B 18/003; A62B 23/02; A62B 18/045; A41D 13/0025; A41D 13/1153; A42B 3/046; A42B 3/286
See application file for complete search history.

(56) References Cited

U.S. PATENT DOCUMENTS

| | | | | |
|---|---|---|---|---|
| 9,248,248 | B2 * | 2/2016 | Virr | A61M 16/0066 |
| 9,848,666 | B1 | 12/2017 | Egeland et al. | |
| 11,541,255 | B2 * | 1/2023 | Shen | A62B 18/006 |
| 12,017,094 | B2 * | 6/2024 | Shen | A62B 18/08 |
| 2002/0020222 | A1 | 2/2002 | Schmidt et al. | |
| 2002/0190866 | A1 | 12/2002 | Richardson | |
| 2003/0024529 | A1 | 2/2003 | Beizndtsson et al. | |
| 2007/0018836 | A1 * | 1/2007 | Richardson | A62B 7/00 340/622 |
| 2008/0148807 | A1 | 6/2008 | Berry et al. | |
| 2009/0266361 | A1 * | 10/2009 | Bilger | A62B 18/006 128/204.21 |
| 2009/0298192 | A1 * | 12/2009 | Parham | A62B 18/088 422/400 |
| 2010/0081411 | A1 | 4/2010 | Montenero | |
| 2010/0083967 | A1 | 4/2010 | Kuriyama | |
| 2010/0083968 | A1 * | 4/2010 | Wondka | G16H 20/40 128/204.23 |
| 2010/0101575 | A1 | 4/2010 | Fedorko et al. | |
| 2010/0224190 | A1 | 9/2010 | Tilley et al. | |
| 2010/0263664 | A1 | 10/2010 | Radivojevic et al. | |
| 2010/0313892 | A1 | 12/2010 | Shigematsu et al. | |
| 2011/0232388 | A1 | 9/2011 | Butterfield | |
| 2012/0111344 | A1 * | 5/2012 | Goranov | A41D 13/1115 29/428 |
| 2012/0138051 | A1 | 6/2012 | Curran et al. | |
| 2012/0197091 | A1 | 8/2012 | Nakano | |
| 2012/0260918 | A1 | 10/2012 | Sayers et al. | |
| 2012/0266873 | A1 | 10/2012 | Lalonde | |
| 2013/0087150 | A1 | 4/2013 | Palacharla et al. | |
| 2013/0104900 | A1 | 5/2013 | Tobias et al. | |
| 2013/0112195 | A1 | 5/2013 | Smith | |
| 2013/0139816 | A1 | 6/2013 | Proctor | |
| 2013/0174845 | A1 | 7/2013 | Vinnakota et al. | |
| 2013/0186414 | A1 * | 7/2013 | Suzuki | A41D 13/1161 128/863 |
| 2013/0327325 | A1 | 12/2013 | Vanderwoude et al. | |
| 2014/0377135 | A1 * | 12/2014 | Dwyer | B01D 46/0086 422/117 |
| 2015/0000651 | A1 | 1/2015 | Palacharla et al. | |
| 2015/0034080 | A1 | 2/2015 | Furuichi et al. | |
| 2015/0217143 | A1 | 8/2015 | Palmer et al. | |
| 2015/0217145 | A1 * | 8/2015 | Teetzel | A62B 9/006 359/885 |
| 2015/0283342 | A1 * | 10/2015 | Mielcarz | A61B 5/0935 128/205.13 |
| 2015/0290478 | A1 | 10/2015 | Curran | |
| 2016/0067531 | A1 | 3/2016 | Pariseau et al. | |
| 2016/0112195 | A1 | 4/2016 | Jochheim et al. | |
| 2016/0193437 | A1 | 7/2016 | Bao et al. | |
| 2016/0193438 | A1 * | 7/2016 | White | A61M 16/026 128/204.23 |
| 2016/0214051 | A1 | 7/2016 | Dicke et al. | |
| 2016/0271429 | A1 | 9/2016 | Hanaoka et al. | |
| 2016/0317848 | A1 | 11/2016 | Zilberstein et al. | |
| 2017/0128754 | A1 | 5/2017 | Hou | |
| 2017/0189727 | A1 | 7/2017 | Hunter et al. | |
| 2017/0196281 | A1 | 7/2017 | Rosati et al. | |
| 2018/0036562 | A1 * | 2/2018 | Patel | A62B 9/006 |

FOREIGN PATENT DOCUMENTS

| | | | | | |
|---|---|---|---|---|---|
| CN | 203777531 | U | | 8/2014 | |
| CN | 104759043 | A | * | 7/2015 | A61B 5/0205 |
| CN | 104886824 | A | | 9/2015 | |
| CN | 204864593 | U | | 12/2015 | |
| CN | 105457177 | A | | 4/2016 | |
| CN | 105495776 | A | * | 4/2016 | |
| CN | 205215977 | U | | 5/2016 | |
| CN | 205235204 | U | | 5/2016 | |
| CN | 105876933 | A | * | 8/2016 | |
| CN | 205492684 | U | | 8/2016 | |
| CN | 105935472 | A | | 9/2016 | |
| CN | 105962483 | A | | 9/2016 | |
| CN | 205252345 | U | | 6/2020 | |
| WO | WO-2015167098 | A1 | * | 11/2015 | A62B 18/025 |
| WO | 2015/187986 | A1 | | 12/2015 | |
| WO | 2015/195303 | A1 | | 12/2015 | |
| WO | WO-2017002123 | A1 | * | 1/2017 | |

OTHER PUBLICATIONS

English translation of CN 104759043, machine translated by Espacenet.com.*
Advisory Action (PTOL-303) Mailed on Apr. 1, 2022 for U.S. Appl. No. 16/336,945, 3 page(s).
Advisory Action (PTOL-303) Mailed on Jan. 25, 2024 for U.S. Appl. No. 18/060,388, 3 page(s).
CN Notification to Grant Mailed on Oct. 28, 2021 for CN Application No. 201680089694.8, 5 page(s).
CN Office Action Mailed on Apr. 28, 2020 for CN Application No. 201680089694.8, 21 page(s).
CN Office Action Mailed on Jan. 21, 2021 for CN Application No. 201680089694.8, 22 page(s).
CN Office Action Mailed on Jul. 2, 2021 for CN Application No. 201680089694.8, 20 page(s).
English translation for CN 105495776, machine translated by Search Clarivate Analytics, translated on Apr. 27, 2023.
English translation for CN 105876933, machine translated by Espacenet.com, translated on Apr. 27, 2023.
English translation for CN 203777531, machine translated by Espacenet.com, translated on Apr. 28, 2023.
English translation of CN Office Action Mailed on Apr. 22, 2022 for CN Application No. 104886824.
English translation of CN Office Action Mailed on Apr. 22, 2022 for CN Application No. 105876933.
English translation of CN Office Action Mailed on Apr. 23, 2022 for CN Application No. 2525941.
English translation of CN Office Action Mailed on Sep. 9, 2022 for CN Application No. 105495776.
Examiner Interview Summary Record (PTOL - 413) Mailed on Mar. 5, 2024 for U.S. Appl. No. 18/060,388, 1 page(s).
Final Office Action Mailed on Jan. 19, 2022 for U.S. Appl. No. 16/336,945.
Final Rejection Mailed on Nov. 15, 2023 for U.S. Appl. No. 18/060,388, 32 page(s).
International Preliminary Report on Patentability mailed on Apr. 2, 2019 for WO Application No. PCT/CN16/100768.
IPEA/409—International Preliminary Report on Patentability Mailed on Apr. 11, 2019 for WO Application No. PCT/CN16/100768.
Non-Final Rejection Mailed on Jul. 8, 2021 for U.S. Appl. No. 16/336,945, 24 page(s).
Non-Final Rejection Mailed on May 11, 2023 for U.S. Appl. No. 18/060,388, 47 page(s).
Notice of Allowance and Fees Due (PTOL-85) and Examiner-Initiated Interview Summary Mailed on May 12, 2022 for U.S. Appl. No. 16/336,945.

(56) References Cited

OTHER PUBLICATIONS

Notice of Allowance and Fees Due (PTOL-85) and Examiner-Initiated Interview Summary Mailed on Sep. 23, 2022 for U.S. Appl. No. 16/336,945.
Notice of Allowance and Fees Due (PTOL-85) Mailed on Mar. 5, 2024 for U.S. Appl. No. 18/060,388, 16 page(s).
Notice of Allowance and Fees Due (PTOL-85) Mailed on May 23, 2022 for U.S. Appl. No. 16/336,945.
Office Action Appendix Mailed on May 12, 2022 for U.S. Appl. No. 16/336,945, 1 page(s).
Office Action Appendix Mailed on May 12, 2022 for U.S. Appl. No. 16/336,945, 4 page(s).
Outgoing—ISA/210—International Search Report and Written Opinion Mailed on May 27, 2017 for WO Application No. PCT/CN16/100768.

* cited by examiner

CUSTOM-CONTROLLABLE POWERED RESPIRATOR FACE MASK

CROSS-REFERENCE TO RELATED APPLICATIONS

This application is a continuation of U.S. patent application Ser. No. 18/060,388, filed Nov. 30, 2022, which is a continuation of U.S. patent application Ser. No. 16/336,945, filed Mar. 27, 2019, which claims priority from PCT Appl. Ser. No. PCT/CN2016/100768 filed Sep. 29, 2016, each of which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD

Embodiments generally relate to respirator face masks, and specifically to powered face masks which may be custom-controllable to better provide for the specific air needs of the individual user wearing the mask.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
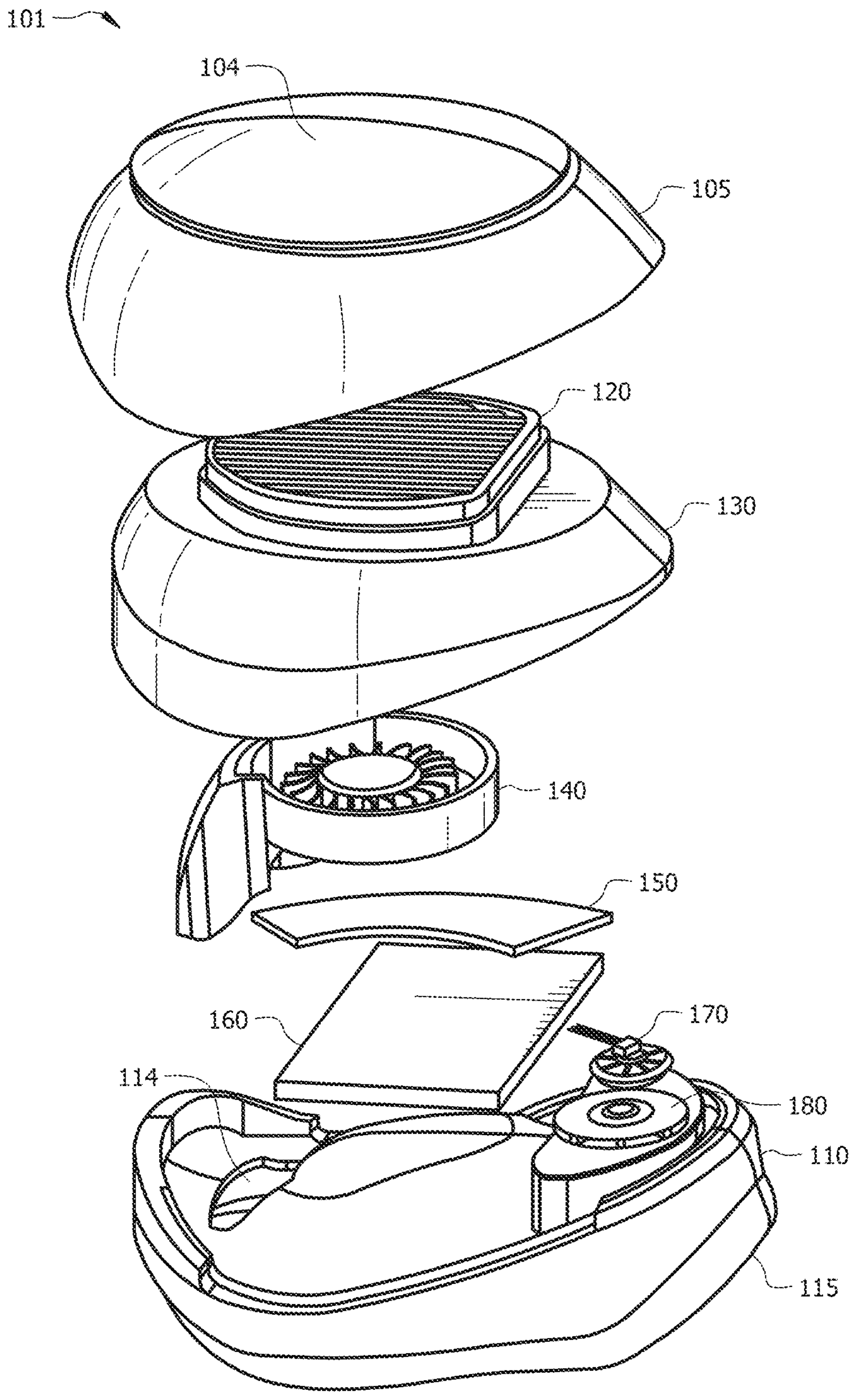
FIG. 1 illustrates an exploded perspective view of an exemplary face mask.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, +/−10%); and If the specification states a component or feature "may," "can," "could," "should," "would," "preferably," "possibly," "typically," "generally," "optionally," "for example," "often," or "might" (or other such language) be included or have a characteristic, that particular component or feature is not required to be included or to have the characteristic. Such component or feature may be optionally included in some embodiments, or it may be excluded.

Disclosed embodiments typically relate to a powered face mask, operable to draw in air from the external atmospheric environment, filter the air, and provide the air to a user (e.g. a wearer of the mask). Such powered face mask embodiments may ease the difficulty of breathing through a filter. However, to better provide the appropriate amount of air to a specific user, the fan speed might be customized (which may include settings based on the user's condition and/or the environment from which the air is being drawn, for example). In other words, the disclosed embodiments seek to provide intelligent control of such a powered face mask respirator, to better adapt the powered face mask respirator to the user, to the user's activity, and/or to the user's environment, hopefully thereby providing an improved breathing experience for the user. Some embodiments may also try to balance the air flow to the user with the power consumption of the respirator mask device, balancing the opposing factors of air flow and power (e.g. battery life) so that fan speed is not substantially above what is needed to assist the user (e.g. so that battery power is not unnecessarily wasted). Additionally, the powered respirator embodiments would preferably be a face mask, with all elements (for example, at least the motorized fan and filter, and preferably also including the processor) located/worn on the user's face. So, minimizing weight and thickness of the mask may also be helpful (to improve comfort and/or wearability). A user friendly way of customizing the respirator mask device (for example, the control of the fan) would also be helpful. Disclosed embodiments may address one or more of these issues, as persons of skill may understand from the below disclosure.

The disclosed embodiments generally relate to a filtration mask comprising: a filter; a motorized fan configured to draw/direct air through the filter into the mask, wherein the motorized fan is a variable speed fan (e.g. multi-speed or speed adjustable); a housing (configured to encase or support the filter and fan); and a processor configured to adjust/control/modify/set the motorized fan speed (for example, based on inputs relating to one or more customization data, which might include user/personalized settings or sensed data or data from the Internet, to offer/provide intelligent control of the fan speed). In some embodiments, the mask may further comprise one or more sensors (operable/configured to detect specific relevant sensed data and to transmit/provide such sensed data to the processor). For example, the one or more sensors may detect one or more of the following (such that sensed data might comprise one or more of the following): breathing rate/frequency, humidity, pressure, temperature, walking speed, heart rate, and/or particulates (in the air). A hall sensor may, for example, be used to determine breathing frequency. In some embodiments, the breathing frequency detected by the hall sensor may be used to determine walking speed and/or heart rate (for example, via correlation using a data look-up chart, which might for example be based on specific user data (e.g. from an earlier customization session) or in conjunction with user age, weight, and height). A particulate matter sensor, such as a Particulate Matter (PM) 2.5 sensor module, might be used to detect particulates which have passed through the filter (e.g. particulates of 2.5 micrometers or greater in size), and this may be used to provide input regarding pollution level and/or to check the efficiency of the mask filter (for example, based on a comparison of the sensed particulate level in the mask versus data (for example, from the Internet) about ambient pollution/particulate levels in the ambient atmosphere).

In some embodiments, the processor might further comprise a wireless receiver (e.g. operable to receive data transmitted from a wireless transmitter, for example on an interface device). In one example, such a receiver and transmitter may operate using Bluetooth™, Wi-Fi, or RF (e.g. radio frequency, for example 413 MHz, 960 MHz, etc.). Some embodiments might relate to systems, which might include mask embodiments similar to those discussed above as well as an interface device (e.g. operable to allow a user to input personalized data or data from the Internet to the processor). For example, the interface device might be operable to enter personalized data, which might comprise the user's height, weight, and/or age. Often, the interface device would comprise a wireless device (typically separate and apart from the mask, such as a cell phone/smart phone) configured (for example, with an app) to allow a user to input personalized data for transmission to the processor (for example, via a wireless transmitter). And in some embodiments, the wireless device may comprise a locator device (such as a Global Positioning System (GPS)) and be configured/operable to interface with the Internet wirelessly to retrieve additional data (such as pollution alert level, weather information (including temperature, humidity, pressure, etc.) for transmission to the processor (for example, based on location). Regardless of the type and manner of inputting customization data (which might include personalized data, environmental data, and/or sensed data), disclosed embodiments typically use (e.g. via the processor) the customization data to determine the appropriate fan speed and to control the motorized fan (of the face mask) based on said determination, thereby providing improved air flow to the user of the mask. This way, the mask can be controlled to ensure that enough air is provided to the user to ensure ease of breathing (e.g. so the user does not have to labor to breathe air through the filter of the face mask), while typically also ensuring that the fan speed is not significantly more than needed by the user (e.g. to maximize battery life of the face mask, so that the face mask can be continuously used for prolonged periods of time). In other words, typically the disclosed embodiments attempt to provide a targeted amount of air to the user, with the targeted amount being approximately the determination by the processor based on the customization data input(s) (and preferably not being below that targeted amount, but perhaps being slightly above that targeted amount, for example up to 10 cfm (e.g. cubic feet per minute) above the targeted amount, but perhaps more typically between 0.1 and 1.0 cfm above the targeted amount).

The Figures illustrate specific exemplary embodiments in more detail, for convenient reference. For example, FIG. 1 illustrates an exemplary powered filtration face mask 101. In the embodiment of FIG. 1, the filter 120, motorized fan 140, processor 150, and battery 160 are all located within a housing of the face mask, with the housing of the embodiment of FIG. 1 including an outer shell 105, an inner shell 110, and a middle shell 130. So, all the other elements are encompassed or encased within the outer shell 105 and the inner shell 110. The outer shell 105 includes an aperture 104, which in FIG. 1 is centrally located and typically may be sized to be at least as large as the filter 120. The inner shell 110 of FIG. 1 includes a face seal 115 (typically located on an inner surface of the inner shell), which might comprise a foam or a silicone pad, and which typically is configured to provide an effective seal (when used with the straps (not shown) to attach the powered filtration mask 101 to a user's face) to prevent air leakage into the mask around its outer perimeter of the inner surface when in place on a user's face. Additionally, the inner shell 110 includes an aperture 114 allowing air to pass through to the user. The filter 120 of FIG. 1 typically might filter PM 2.5 particle size (e.g. particles of about 2.5 micrometers or larger).

The middle shell 130 of FIG. 1 has the filter 120 mounted to its outer surface, and is configured to effectively separate the filter 120 from the motorized fan 140, while allowing the motorized fan 140 to draw air through the filter 120 and to direct filtered air further into the powered filtration mask 101. Thus, the middle shell 130 typically would have an aperture (not shown, since located behind the filter 120) positioned and sized for interaction with the filter 120 (e.g. with the filter 120 attaching atop the aperture in the middle housing so as to completely cover the aperture, and typically with the filter 120 being mounted over the aperture in the middle shell 130 in a sealing manner, to prevent any leakage of air from entering further into the powered filtration mask 101 without passing through the filter 120), along with an outer perimeter that is sized and shaped to interact with the inner and/or outer shells so that, in order to pass through to the inside of the powered filtration mask 101 (beyond the inner shell 110), air would have to pass through the filter 120. In other words, the middle shell 130, outer shell 105, inner shell 110 and filter 120 are each configured to interact with the other elements to direct all airflow entering the powered filtration mask 101 through the filter 120 and to the user of the powered filtration mask 101 (e.g. in the inner space formed by the inner surface of the inner shell 110). In FIG. 1, the middle shell 130 also comprises a hollow body, with a cavity sized and shaped to entirely encompass the motorized fan 140. Typically, the cavity of the middle shell 130 would be sufficiently deep so that there is a gap between the motorized fan 140 and the filter 120 of at least approximately 3 mm (for example approximately 3-5 mm).

The motorized fan 140 of FIG. 1 typically is a variable speed fan, with a plurality of fan speeds available. Typically, the motorized fan 140 might be configured to be variably adjustable to any speed from about 100 to 7500 rpm, might have an airflow range from about 0.1 to 10 cfm, and/or might have air pressure from about 0.5-10 mmH2O. The motorized fan 140 of FIG. 1 typically is adjusted based on electrical inputs to the motor from the processor 150 (which is communicatively coupled to the motorized fan 140 and configured so that the processor 150 can control the motorized fan 140). The processor 150 of FIG. 1 might be a PCBA (e.g. a Printed Circuit Board Assembly) typically having in some embodiments a power management module, an MCU (e.g. micro-controller unit), a Bluetooth module, a motion sensor, a pressure sensor and humidity sensor (although in other embodiments the processor might not include one or more integrated sensors, with one or more of the sensors being located elsewhere and communicating with the processor). The MCU (of such a processor) typically would have at least 128 KB flash, 20 KB RAM, 1 IIC, 1 UART, 12-bits ADC and/or 31GPIOs. In some embodiments, the processor 150 may include memory storage space (which may include Read-Only Memory (ROM) for the instructions of how the processor 150 uses data to control the motorized fan 140 and/or Random-Access Memory (RAM) for the customization data input(s)) and/or a wireless receiver (operable to receive data (for example, customization data) transmitted wirelessly (for example, from a wireless transmitter, which might be part of an interface device). The wireless receiver may be configured to receive information via Bluetooth™, Wi-Fi or RF. In some embodiments (with sensors for example), the processor 150 might also be configured to be in communication with sensors to receive customization data from such sensors. The processor 150 and the motorized fan 140 of FIG. 1 typically are both powered by a battery 160, which typically might be either a disposable or a rechargeable battery (for example providing the PCBA with power at about 3.7 volts and at least output of 250 mA (e.g. milliAmps) current. In FIG. 1, the processor 150 and battery 160 may be located behind (e.g. inward) of the motorized fan 140.

The processor 150 of FIG. 1 would typically be configured to use customization data input(s) to determine the appropriate fan speed and to control the motorized fan 140. In FIG. 1, the customization data input(s) (received by the processor 150) might typically relate to one or more of the following: sensor data, user or personalized data, and/or Internet data (for example, relating to the environment in general). Sensor data might relate to breathing rate or frequency, humidity, pressure, temperature, walking speed, heart rate, and/or particulates. While any number of sensors might be used to provide sensor data (with the sensors typically mounted in or on the powered filtration mask 101 housing), in FIG. 1 a hall sensor 170 is used to determine breathing frequency. For example, the hall sensor 170 might be positioned and configured so that inhalation and exhalation by a user of the powered filtration mask 101 would deflect the hall sensor 170, thereby altering the magnetic field of the hall sensor 170 and changing the electrical sensor input to the processor 150 in a way that correlates to breathing rate or frequency. And in some embodiments, the processor 150 might correlate breathing rate with walking speed and/or heart rate (for example, in conjunction with user data about the user's height, weight and/or age). Additionally, in FIG. 1 particulate data might be sensed using a PM 2.5 sensor module operable to detect particulates of about 2.5 micrometers or greater in size. Both sensors would be communicatively coupled to the processor 150, in order to provide customization data to the processor 150 which might be used to better control fan speed. User or personalized data might be input to the processor 150 via an interface device, which in some embodiments might be a wireless interface device (such as a cell phone or smart phone, as shown for example in FIGS. 2 and 3). For example, personalized or user data might include the user's height, weight, and or age. In some embodiments, the processor 150 might be pre-configured with default data, which it might then use for one or more of the customization data input(s) which are not supplied. For example, if the user does not input his age, weight, and/or height, then the processor 150 may use default numbers for these (for example based on demographic information). For example, in some embodiments the powered filtration mask 101 processor 150 is wirelessly communicatively coupled to a wireless interface device. The interface device might provide location information (for example, using GPS) and then access the Internet to pull additional general data which may be used as customization data for the processor 150 of FIG. 1. For example, the processor 150 may be configured to compare the sensed filter particulates (from the PM 2.5 sensor module, for example) within the powered filtration mask 101 to the pollution data from the Internet and to provide the user with an indication of the effectiveness of the filter 120 (for example by transmitting the sensed particulate data to the wireless device or the processor 150, which then pulls the pollution data from the Internet, compares the data, and generates an output (for example on its display screen)).

FIG. 1 also comprises an exhalation valve 180 operable to direct exhaled air outward from the inner shell 110 (while not allowing air to enter through the exhalation valve 180). In FIG. 1, the exhalation valve 180 and the hall sensor 170 are mounted on the external/outer surface of the inner shell 110, and typically the hall sensor 170 might be located in proximity to the exhalation valve 180 (to better sense the difference between inhalation and exhalation in order to determine the breathing rate). Additionally, in FIG. 1 the PM 2.5 sensor module (not shown) is located within the inner shell 110 (for example, mounted upon the inner surface of the inner shell 110, so that the PM 2.5 sensor module would be operable to detect particulates within the inner shell 110 (e.g. after filtration). The inner shell 110 of FIG. 1 typically might have its aperture 114 located in proximity to the bottom of the inner shell 110 (with for example, the exhalation valve 180 and hall sensor 170 mounted in proximity to the top of the inner shell 110). The inner shell 110 of the embodiment of FIG. 1 typically would comprise a hollow body with a cavity formed by its inner surface, and such inner surface cavity would typically be about 0.5 to 3.0 cm deep (providing an air space gap between the inner shell 110 and the user's face, and providing space for various user facial contours to fit within the powered filtration mask 101 comfortably (e.g. without contacting the inner surface of the inner shell 110)). In FIG. 1, the powered filtration mask 101 is a half mask, configured to cover a user's mouth and nose. One or more straps or a harness (not shown) would typically attach to the powered filtration mask 101 and allow for securing of the powered filtration mask 101 to a user's face. The powered filtration mask 101 of FIG. 1 is typically configured to have a thin profile (e.g. a thickness of 5 cm or less, for example 1.5-5 cm) and/or to be lightweight (e.g. a weight of about 110 g or less, for example 75-110 g).

Figure 2:
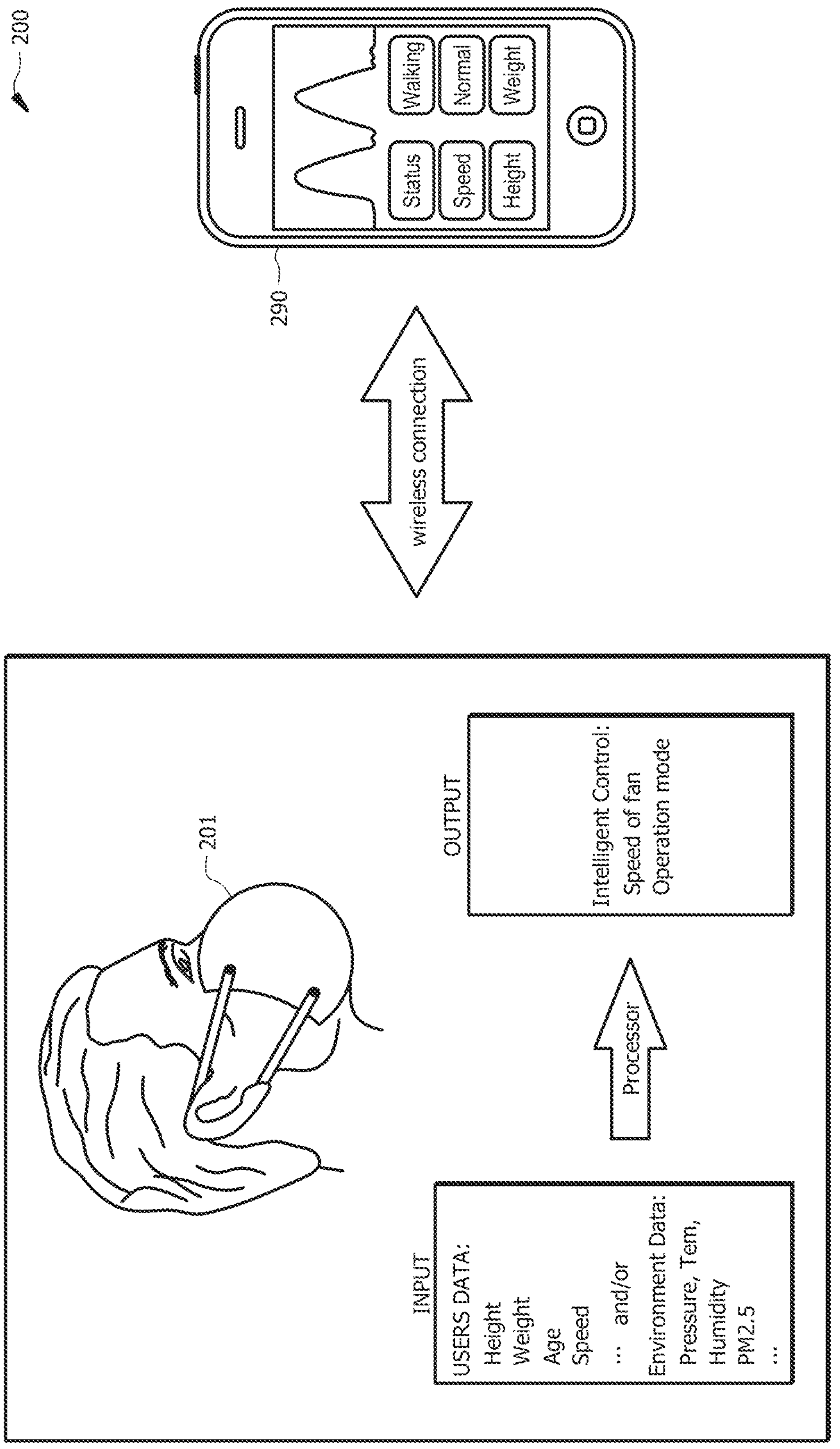
FIG. 2 illustrates in schematic diagram an exemplary system for controlling the fan speed of an exemplary face mask.

FIG. 2 illustrates an exemplary system 200, with a mask 201 (which might be similar to that described above) configured to receive input data at a processor and to have the processor use that input data to generate an output control signal to the motorized fan of the mask 201 based on the input data (thereby providing intelligent control of the motorized fan of the mask to better provide the appropriate amount of air to the user of the mask 201). The processor may use any type of customization data as input data, for example including sensed (or environmental) data, personalized/user data, and/or Internet data (as described elsewhere), to determine the appropriate fan speed for the mask 201. And while the input data of FIG. 2 could come from any interface device (e.g. on the mask, wired, or wireless), in FIG. 2 at least some of the input data (for example, the user data regarding height, weight, and age) might be input using a wireless interface device 290 operable to communicatively couple with the mask 201 processor. In FIG. 2, other of the input data (for example, sensed data) might come from sensors mounted in the mask. In FIG. 2, the wireless interface device 290 would be separate and apart from the mask 201 (such as a cell phone/smart phone) and would be configured (for example with an app) to allow a user to input personalized/user data for transmission to the processor (for example via a wireless transmitter). The wireless interface device 290 might also receive from the processor of the mask 201 output signals for display of relevant information on the screen of the wireless interface device 290 (for example, showing walking speed and/or heart rate of the user of the mask 201).

In the system 200 of FIG. 2, the wireless interface device 290 might also comprise a locator device (such as GPS) and be configured/operable to interface with the Internet wirelessly to retrieve additional data (such as pollution alert level or weather information (including temperature, humidity, pressure, etc.) for example, based on GPS location) for transmission to the processor of the mask 201. In some embodiments, the processor of the mask 201 may be configured to compare the sensed filter particulates within the mask 201 to the pollution data from the Internet and to provide the user with an indication of the effectiveness of the filter via the wireless interface device 290 (for example by comparing the sensed particulate data to the pollution data from the Internet, and generating an output (for example on the display screen of the wireless interface device 290)).

Figure 3:
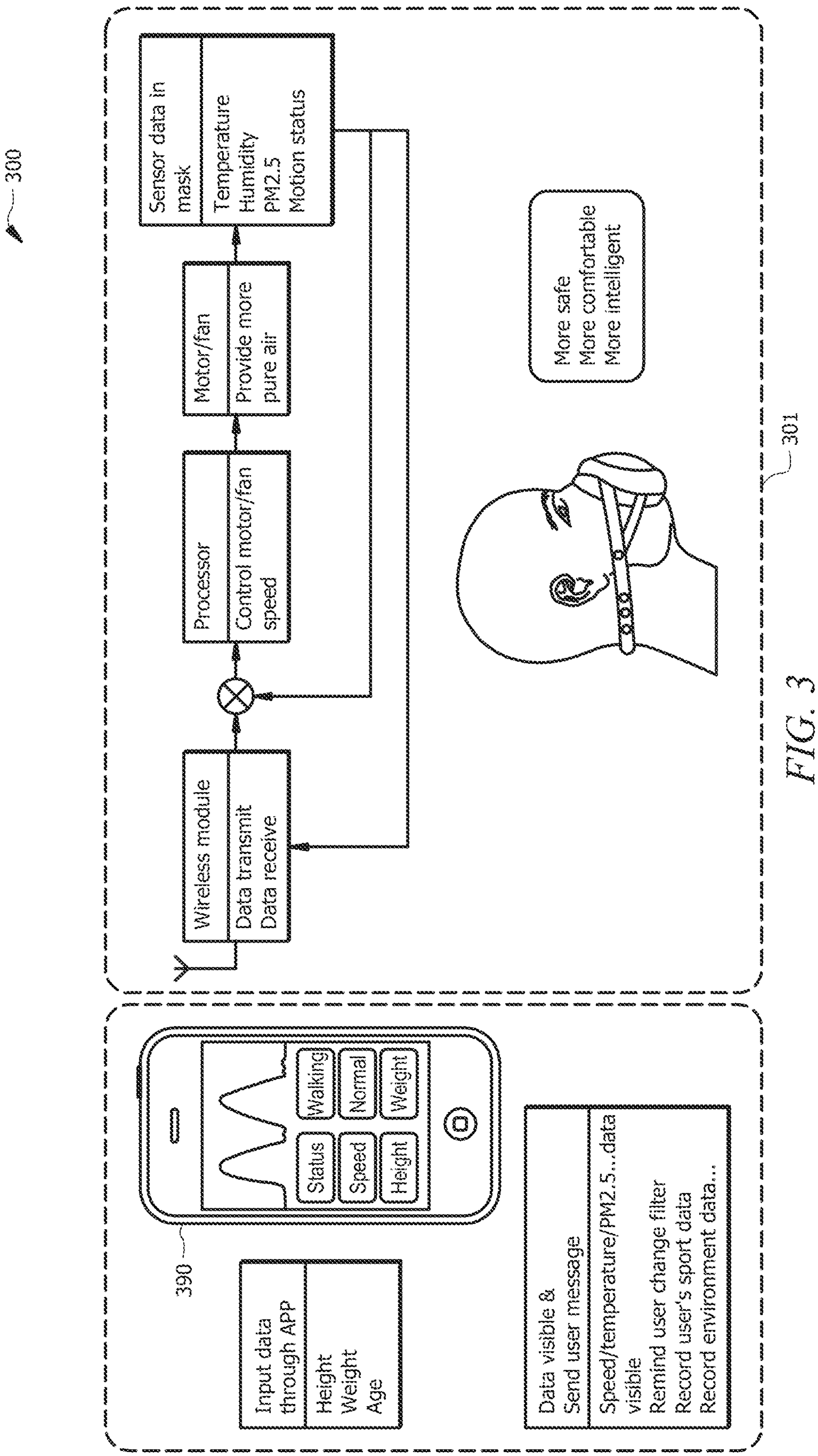
FIG. 3 illustrates in schematic diagram another exemplary system/method for controlling the fan speed of an exemplary face mask.

FIG. 3 illustrates a similar exemplary system 300, with more detail. The system 300 comprises a mask 301 and a wireless interface device 390. The mask 301 may comprise a wireless module (allowing communication between the processor of the mask and the wireless interface device 390), a processor configured to control the motorized fan speed based on data from the wireless interface device 390 and the sensors of the mask 301, a motorized fan operable to provide filtered air to the user of the mask 301 (by directing air through a filter and into the mask interior) based on the instructions from the processor, and one or more sensors configured to provide sensor data to the processor (as part of the customization data that the processor uses to determine the appropriate fan speed and control the motorized fan). FIG. 3 illustrates various optional data inputs from the wireless interface device 390 and the sensors (which may be used by the processor of the mask). Additionally, the processor of the mask 301 may use the wireless module of the mask 301 to transmit information for display to the wireless interface device 390, as shown in FIG. 3. In some embodiments, the wireless module may be part of (or mounted on) the processor. In some embodiments, the wireless interface device 390 may record data transmitted by the processor of the mask 301. Persons of skill should understand these and other such systems for interfacing with and/or using motorized fans in face masks based on the disclosure as a whole.

Figure 4:
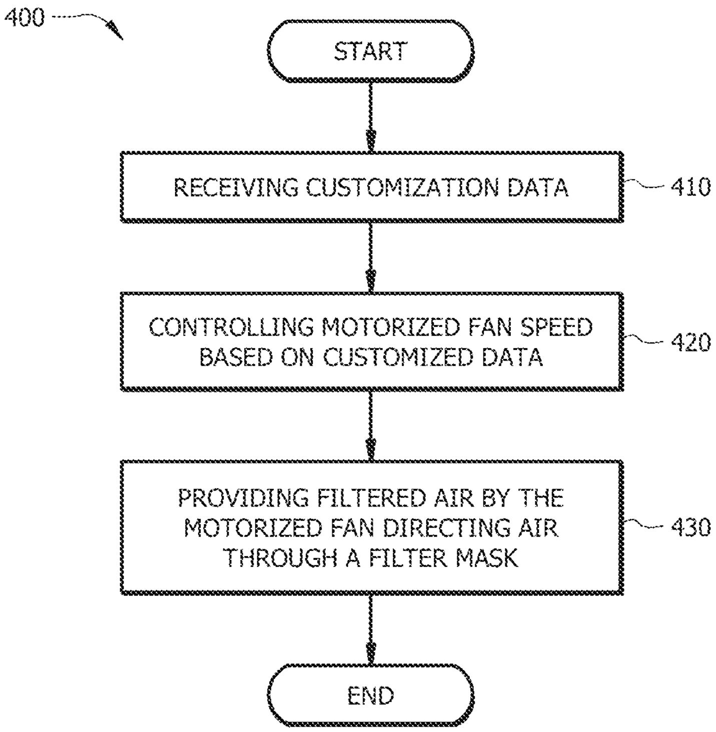
FIG. 4 illustrates a flowchart of an exemplary method of controlling the fan speed of an exemplary face mask.

FIG. 4 illustrates an exemplary method 400 for controlling a motorized fan of a powered filtration (respirator) face mask (for example, using one of the mask embodiments described herein). The method 400 comprises the steps of: 410 receiving one or more customization data inputs (e.g. by or at a processor (in the face mask)); 420 controlling the motorized fan speed (at the mask, by the processor) based on the one or more customized data inputs; and 430 providing filtered air (at the mask) by the motorized fan drawing or directing air through the filter (from the external atmospheric environment, to the inside of the mask to a user wearing the mask). For example, controlling the motorized fan speed might further comprise: determining the appropriate fan speed (by the processor) and generating a corresponding output signal based on the one or more customized data inputs; and transmitting (by the processor) the output signal to the motorized fan. The customization data input(s) could be any of those described herein with regard to any mask or system embodiments. Further details of such method embodiments will be apparent to persons of skill, especially in light of the disclosure as a whole.

Having described above various device and method embodiments (especially with respect to the figures), various additional embodiments may include, but are not limited to, the following:

In a first embodiment, a filtration mask comprising: a filter; a motorized fan configured to draw/direct air through the filter into the mask, wherein the motorized fan is variable speed (e.g. multi-speed or speed adjustable); a housing (configured to encase or support the filter and fan); and a processor configured to adjust/control/modify/set the motorized fan speed (based on inputs relating to one or more customization data, which might include user/personalized settings or sensed data or data from the Internet, to offer/provide intelligent control of the fan speed). A second embodiment can include the mask of the first embodiment, further comprising one or more sensors (operable/configured to detect specific relevant sensed data and to transmit/provide such sensed data to the processor). A third embodiment can include the mask of the second embodiment, wherein the one or more sensors detect (or the sensed data comprises) one or more of the following: breathing rate/frequency, humidity, pressure, temperature, walking speed, heart rate, and/or particulates (in the air). A fourth embodiment can include the mask of any of the second to third embodiments, wherein a hall sensor is used to determine breathing frequency (with the hall sensor typically located so that inhalation and exhalation can be effectively measured, for example in proximity to the exhalation valve). A fifth embodiment can include the mask of the fourth embodiment, wherein the breathing frequency detected by the hall sensor is used to determine walking speed and/or heart rate (via correlation using a data look-up chart, for example based on specific user data (e.g. from a customization session) or in conjunction with user age, weight, and height). A sixth embodiment can include the mask of any of the second to fifth embodiments, wherein a particulate matter sensor, such as a PM 2.5 sensor module, detects particulates which have passed through the filter (e.g. particulates of 2.5 micrometers or greater in size) (which, for example, may be used to provide input regarding pollution level and/or to check the efficiency of the mask filter). A seventh embodiment can include the mask of any of the first to sixth embodiments, wherein the processor is configured to use default data for any personalized data that is not provided (e.g. via sensor or interface device). An eighth embodiment can include the mask of any of the first to seventh embodiments, further comprising a face seal (which might be a silicone pad typically located on an inner surface of the mask and configured for sealing contact with a user's face). A ninth embodiment can include the mask of any of the first to eighth embodiments, wherein the housing comprises an outer shell and an inner shell, wherein the outer shell and the inner shell each have apertures/openings/vent holes allowing air flow from the external environment, through the mask (e.g. filter), and to the user (and wherein the housing might optionally include a middle shell (with an aperture sized for interaction with the filter) located between the filter and the fan and/or onto which the filter may be mounted and/or which may comprise a hollow cavity surrounding the fan). A tenth embodiment can include the mask of the ninth embodiment, wherein the filter is removably mounted/attached to the middle shell. An eleventh embodiment can include the mask of any of the ninth to tenth embodiments, wherein the inner shell comprises a hollow cavity in its interior surface shaped to provide an air space around a user's mouth and nose when the mask is worn by the user (for example, the air space having a volume greater than about 150 cubic centimeters (for example 150-200 or 150 to 300 cubic centimeters)). An eleventh embodiment can include the mask of any of the first to tenth embodiments, wherein the processor further comprises a wireless receiver operable to receive data transmitted from a wireless transmitter (for example, on an interface device). A twelfth embodiment can include the mask of the eleventh embodiment, wherein the receiver and transmitter may operate using Bluetooth™, WiFi, or RF. A thirteenth embodiment can include the mask of any of the first to twelfth embodiments, further comprising a (one-way) exhalation valve (operable to direct the exhalation of a user wearing the mask outside of the mask, while not allowing external air to enter the mask via the exhalation valve—or operable to direct exhalation outside the inner shell of the mask, for example without allowing air to enter the inner shell through the exhalation valve).

In a fourteenth embodiment, the mask of any of embodiments 1-13 (or a system including the mask of any of embodiment 1-13) further comprising an interface device (e.g. operable to allow a user to input personalized data or data from the Internet to the processor). A fifteenth embodiment can include the mask of the fourteenth embodiment, wherein the personalized data comprises the user's height, weight, and/or age. A sixteenth embodiment can include the mask of any of the fourteenth to fifteenth embodiments, wherein the interface device comprises a wireless device (separate and apart from the mask, such as a cell phone/smart phone) configured (for example, with an app) to allow a user to input personalized data for transmission to the processor (for example, via a wireless transmitter). A seventeenth embodiment can include the mask of any of the fourteenth to sixteenth embodiments, wherein the wireless device comprises a locator device (such as GPS) and is configured/operable to interface with the Internet wirelessly to retrieve additional data (such as pollution alert level, weather information (including temperature, humidity, pressure, etc.) for transmission to the processor. An eighteenth embodiment can include the mask of any of the fourteenth to seventeenth embodiments, wherein the interface device is located on the mask. A nineteenth embodiment can include the mask of any of the fourteenth to eighteenth embodiments, wherein the mask comprises a data input port (and wherein the interface device comprises a docking station at which the mask may be connected via the port for transfer of data or a computerized device, such as a desktop computer, to which the mask may be connected via wire (such as a Universal Serial Bus (USB) line)). A twentieth embodiment can include the mask of any of the first to nineteenth embodiments, wherein the mask comprises a signal device (such as a Light-Emitting Diode (LED) light or an audio speaker), and wherein the processor is configured to activate the signal device when the filter should be changed. A twenty-first embodiment can include the mask of any of the first to twentieth embodiments, further comprising memory storage (for example, 2 MB memory storage, which might be in connection with an MCU with IIC port), wherein the processor records sensed data and/or input data for the user. A twenty-second embodiment can include the mask of any of the first to twenty-first embodiments, wherein the mask processor is configured to be associated with a user (for example, by entry of a user name or employee number via the interface device). A twenty-third embodiment can include the mask of any of the first to twenty-second embodiments, wherein the filter is operable to filter PM 2.5 particle size (e.g. particles 2.5 micrometers or greater). A twenty-fourth embodiment can include the mask of any of the first to twenty-third embodiments, wherein the motorized fan has a speed range of about 100-7500 rpm and/or an airflow rate range of about 0.1 to 10 cfm and/or air pressure of about 0.5 to 10 mm H2O. A twenty-fifth embodiment can include the mask of any of the first to twenty-fourth embodiments, wherein the processor is configured to compare the sensed filter particulates within the mask to the pollution data from the Internet and to provide the user with an indication of the effectiveness of the filter (for example by transmitting the sensed particulate data to the wireless device, which then pulls the pollution data from the Internet, compares the data, and generates an output (for example, on its display screen)). A twenty-sixth embodiment can include the mask of any of the first to twenty-fifth embodiments, further comprising one or more straps (e.g. head straps, neck straps, and/or ear straps) or harness or other means for secure attachment of the mask in place on a user's face, configured for attachment of the mask onto a user's face (in a manner providing for effective sealing of the mask where it contacts the user's face). A twenty-seventh embodiment can include the mask of any of the first to twenty-sixth embodiments, wherein the processor uses the inputs to (determine the appropriate fan speed and to accordingly) adjust the fan speed, thereby adjusting the air drawn through the filter and into the mask (to the user) dynamically. A twenty-eighth embodiment can include the mask of any of the first to twenty-seventh embodiments, further comprising a battery (e.g. configured/operable to power the processor and the motorized fan). A twenty-ninth embodiment can include the mask of the twenty-eighth embodiment, wherein the battery is rechargeable (and wherein the mask further comprises a power/recharging port configured/operable to allow for connection to a wall socket or other power source capable of recharging the battery). A thirtieth embodiment can include the mask of any of the first to twenty-ninth embodiments, wherein the mask is configured (e.g. as a half-mask) to (sealingly) cover a user's mouth and nose. A thirty-first embodiment can include the mask of any of the first to thirtieth embodiments, wherein the mask is configured as a full-face mask (e.g. to sealingly) cover the user's entire nose (e.g. more than just the mouth and nose, typically including the user's eyes)). A thirty-second embodiment can include the mask of any of the first to thirty-first embodiments, wherein the mask has a thin profile (e.g. a thickness/depth of less than about 4 cm or about 5 cm (for example, 3-4 cm, 3-5 cm, or 4-5 cm)). A thirty-third embodiment can include the mask of any of the first to thirty-second embodiments, wherein the mask has an overall weight of less than about 110 g. A thirty-fourth embodiment can include the mask of any of the first to thirty-third embodiments, wherein the motorized fan and filter (for example, located within the housing) are located on the face mask (e.g. for attachment to the user's face and the entire filtration mask is configured to be worn on the user's face). A thirty-fifth embodiment can include the mask of any of the first to thirty-fourth embodiments, wherein the processor may be manually controlled to set fan speed.

Exemplary embodiments might also relate to methods for controlling the fan in such mask embodiments (e.g. similar to those described above, which may be considered incorporated herein with respect to the discussion of the methods). Such method embodiments, for example, might include, but are not limited to, the following:

In a thirty-sixth embodiment, a method of controlling a motorized fan of a powered filtration (respirator) face mask, comprising the steps of: receiving one or more customization data inputs (e.g. by or at a processor (in the face mask)); and controlling the motorized fan speed (at the mask by the processor) based on the one or more customized data inputs. A thirty-seventh embodiment can include the method of the thirty-sixth embodiment, further comprising providing filtered air (at the mask) by the motorized fan drawing or directing air through the filter (from the external atmospheric environment, to the inside of the mask to a user wearing the mask). A thirty-eighth embodiment can include the method of any of the thirty-sixth to thirty-seventh embodiments, wherein controlling the motorized fan speed further comprises: determining the appropriate fan speed (by the processor) and generating a corresponding output signal based on the one or more customized data inputs; and transmitting (by the processor) the output signal to the motorized fan. A thirty-ninth embodiment can include the method of any of the thirty-sixth to thirty-eighth embodiments, wherein the one or more customization data inputs comprise sensor inputs relating to one or more of the following: breathing rate/frequency, humidity, pressure, temperature, walk speed, heart rate, particulates (in the air). A fortieth embodiment can include the method of any of the thirty-sixth to thirty-ninth embodiments, further comprising sensing (at the mask) one or more customization data inputs (for transmission to the processor). A forty-first embodiment can include the method of any of the thirty-sixth to fortieth embodiments, wherein sensing the customization data inputs comprises using a hall sensor to determine breathing frequency (with the hall sensor typically located so that inhalation and exhalation can be effectively measured, for example in proximity to the exhalation valve). A forty-second embodiment can include the method of any of the thirty-sixth to forty-first embodiments, wherein the breathing frequency detected by the hall sensor is used to determine walking speed and/or heart rate (e.g. via correlation using a data look-up chart, for example based on specific user data (e.g. from a customization session) or in conjunction with user age, weight, and height). A forty-third embodiment can include the method of any of the thirty-sixth to forty-second embodiments, wherein sensing the customization data inputs comprises using a particulate matter sensor, such as a PM 2.5 sensor module, to detect particulates which have passed through the filter (e.g. particulates of 2.5 micrometers or greater in size, which may be used to provide input regarding pollution level and/or to check the efficiency of the mask filter). A forty-fourth embodiment can include the method of any of the thirty-sixth to forty-third embodiments, wherein one or more of the customization data inputs is transmitted (to the processor) by a wireless interface device (separate and apart from the mask, such as a cell phone/smart phone) configured (for example, with an app) to allow a user to input personalized data for transmission to the processor (for example, via a wireless transmitter). A forty-fifth embodiment can include the method of any of the thirty-sixth to forty-forth embodiments, wherein the personalized data comprises the user's height, weight, and/or age. A forty-sixth embodiment can include the method of any of the thirty-sixth to forty-fifth embodiments, wherein the wireless interface device comprises a locator device (such as GPS), the method further comprising interfacing with the Internet wirelessly (via the wireless interface device) to retrieve additional data (such as pollution alert level, weather information (including temperature, humidity, pressure, etc.) for transmission to the processor. A forty-seventh embodiment can include the method of any of the thirty-sixth to forty-sixth embodiments, wherein the processor is pre-configured to use default data for one or more of the personalized data that is not provided (e.g. via sensor or interface device). A forty-eighth embodiment can include the method of any of the thirty-sixth to forty-seventh embodiments, wherein controlling the motorized fan speed comprises the fan speed being about 100 to 7500 rpm. A forty-ninth embodiment can include the method of any of the thirty-sixth to forty-eighth embodiments, wherein providing filtered air further comprises providing air filtered to remove PM 2.5 particle size. A fiftieth embodiment can include the method of any of the thirty-sixth to forty-ninth embodiments, wherein controlling the fan speed further comprises manually controlling the fan speed (for example, based on recommendation by the processor, which might be based on customization data inputs). A fifty-first embodiment can include the method of any of the thirty-sixth to fiftieth embodiments, wherein the processor compares sensed filter particulates within the mask to pollution data from the Internet and provides the user with an indication of the effectiveness of the filter (for example by transmitting the sensed particulate data to the wireless device, which then pulls the pollution data from the Internet, compares the data, and generates an output (for example on its display screen)). A fifty-second embodiment can include the method of any of the thirty-sixth to fifty-first embodiments, further comprising donning the face mask, wherein the filter, motorized fan, and processor are all located on the face mask (and wherein the face mask is lightweight (for example less than about 110 g) and/or has a slim/thin profile (e.g. with a depth/thickness less than 4 cm or 5 cm (for example, 3-4 cm, 3-5 cm, or 4-5 cm)). A fifty-third embodiment can include the mask of any of the thirty-sixth to fifty-second embodiments, further comprising associating a user with the mask (e.g. using a wireless interface device) (for example, by entering a user name and/or employee number and/or scanning a bar code on the mask or entering a mask serial number, which optionally might allow for pre-set personalized data to be downloaded (e.g. from the Internet or an intranet or the Cloud) via the wireless interface device to the processor of the mask).

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s).

Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A filtration mask, comprising:

a filter;

a motorized fan configured to direct air through the filter into the filtration mask;

a housing configured to support the filter and the motorized fan and comprising an inner shell; two or more sensors, wherein a first sensor of the two or more sensors is configured to generate data indicative of particulates which have passed through the filter, wherein a hall sensor of the two or more sensors is mounted on an outer surface of the inner shell in proximity to an exhalation valve of the filtration mask and configured to generate customization data indicative of a breathing frequency of a user; and a processor communicably coupled with the hall sensor and the motorized fan, the processor configured to:

receive the customization data, modify a speed of the motorized fan based upon the customization data so as to modify a speed of the air directed through the filter and into the filtration mask such that an amount of air provided to the user is more than a target amount of air determined by the processor based on the customization data, receive each of pollution data from internet and the data indicative of particulates which have passed through the filter from the two or more sensors, compare the data indicative of particulates which have passed through the filter with the pollution data; and transmit an output signal to a device based on a result of the comparison.

2. The filtration mask according to claim 1 wherein the two or more sensors comprise a third sensor, and the third sensor is configured to generate second customization data;

wherein the processor is further configured to:

receive the second customization data; and modify the speed of the motorized fan based on the second customization data.

3. The filtration mask according to claim 2, wherein the second customization data comprises a humidity of an external environment of the filtration mask.

4. The filtration mask according to claim 2, wherein the second customization data comprises a temperature of an external environment of the filtration mask.

5. The filtration mask according to claim 2, wherein the second customization data comprises a heart rate of the user of the filtration mask.

6. The filtration mask according to claim 2, wherein the second customization data comprises a pressure of an external environment of the filtration mask.

7. The filtration mask according to claim 2, wherein the processor is further configured to receive third customization data from the device, wherein the third customization data comprises a physical location of the user of the filtration mask.

8. The filtration mask according to claim 2, wherein the second customization data comprises a walking speed of the user of the filtration mask.

9. The filtration mask according to claim 2, wherein the processor is further configured to receive third customization data from the device based on a user input obtained at the device, wherein the third customization data comprises at least one of a height, weight, or age of the user of the filtration mask.

10. The filtration mask of claim 1, wherein the processor is further configured to receive a preset personalized data associated with the user from the internet and modify the speed of the motorized fan based thereupon.

11. The filtration mask of claim 1, wherein the housing further comprises an outer shell, wherein the outer shell and the inner shell each define one or more apertures to allow air flow from an external environment of the filtration mask through the filtration mask to the user of the filtration mask.

12. The filtration mask of claim 11, wherein the inner shell comprises a hollow body with a cavity formed by an inner surface thereby.

13. The filtration mask of claim 12, wherein a depth associated with the cavity is within a range of 0.5 cm to 3 cm.

14. The filtration mask of claim 12, wherein the cavity is configured to provide an air space around the user's nose and mouth.

15. The filtration mask of claim 14, wherein the air space has a volume greater than about 150 cubic centimeters.

16. The filtration mask of claim 11, wherein the one or more apertures of the inner shell is disposed in proximity to bottom of the inner shell.

17. The filtration mask of claim 1, wherein the exhalation valve and the hall sensor are disposed in proximity to top of the inner shell.

18. A method of controlling a filtration mask, comprising:
providing the filtration mask comprising:
a filter;
a motorized fan configured to direct air through the filter of the filtration mask;
a housing configured to support the filter and the motorized fan and comprising an inner shell; and
two or more sensors wherein a first sensor of the two or more sensors is configured to generate data indicative of particulates which have passed through the filter, wherein a hall sensor of the two or more sensors is mounted on an outer surface of the inner shell in proximity to an exhalation valve of the filtration mask and configured to generate customization data indicative of a breathing frequency of a user;
wherein the method comprises:
receiving, via a processor, pollution data from internet and the customization data;
modifying, by the processor, a speed of the motorized fan based upon the customization data so as to modify a speed of the air directed through the filter and into the filtration mask such that an amount of air provided to the user is more than a target amount of air determined by the processor based on the customization data;
generating, by the first sensor, the data indicative of particulates which have passed through the filter,
comparing, by the processor, the data indicative of particulates which have passed through the filter with the pollution data, and
transmitting, by the processor, an output signal to a device based on a result of the comparison.

* * * * *